Dec. 1, 1959   P. P. ZAKIN   2,914,986
OPHTHALMIC MOUNTING
Filed Feb. 27, 1959

INVENTOR.
Paul P. Zakin
BY Irving Seidman
ATTORNEY

United States Patent Office 2,914,986
Patented Dec. 1, 1959

2,914,986

OPHTHALMIC MOUNTING

Paul P. Zakin, East Meadow, N.Y., assignor to Spectralum Corp., a corporation of New York Application February 27, 1959, Serial No. 796,107

1 Claim. (Cl. 88—47)

This invention relates to ophthalmic mountings; and more particularly concerns mountings made of rigid metal in cast, stamped, machined, fabricated or other suitable form.

An object of this invention is to provide an ophthalmic mounting formed of metal, wherein each of the lens receiving rims has associated therewith an improved resilient liner for seating the lens.

A further object of this invention is to provide in an ophthalmic mounting of the character described, a resilient liner having a structure which is particularly adapted to accommodate and seat a lens despite any possible irregularities or inaccuracies in grinding the periphery of the lens.

Another object of this invention is to provide in an ophthalmic mounting an improved, resilient liner for mounting lens in a manner to render the same substantially shock and vibration proof.

Yet another object of this invention is to provide for use with ophthalmic mountings, a resilient liner for seating the lenses, such lining having a structure which will be operative to relieve any stresses arising from the engagement of a lens with its metal mounting, due to unequal compression caused by improper grinding of the lens or misfitting of the lens to the mounting.

Still another object of this invention is to provide an improved, resilient liner for lenses inserted in ophthalmic mountings, such liner having a structure which facilitates the operation of fitting lenses to a metal frame despite grinding inaccuracies on the periphery of the lenses, and minimizing lens breakage during the fitting operation.

Other objects of this invention will in part be obvious and in part hereinafter pointed out.

Figure 1:
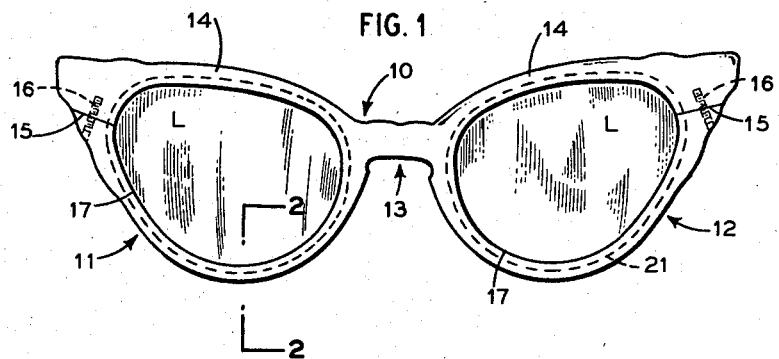
Figure 2:
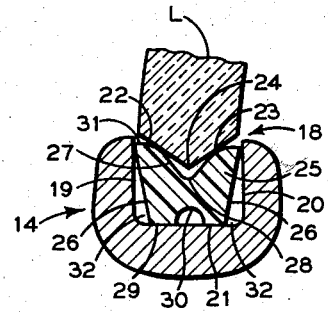

In the drawing, Fig. 1 is a front elevational view of an ophthalmic mounting or spectacle frame embodying the invention;

Fig. 2 is a transverse section taken on the line 2—2 of Fig. 1.

Referring in detail to the drawing, 10 designates a spectacle frame embodying the invention. The same is of the fabricated metal, substantially rigid type; comprising the usual open lens receiving portions 11, 12 joined by the bridge or nose piece 13.

Each of the lens receiving portions 11, 12 comprises an annular metal portion 14 which is transversely split at its outer ends as at 15, to allow a lens L to be inserted therein. The split portions of the lens receiving portions 15 are held together by a screw 16 in the usual manner. The inner annular edge 17 of the lens receiving portions 14, 15 is cut by means of a suitable tool to form a channel 18. The channel 18 is defined by opposed, substantially parallel side walls 19, 20 and a bottom wall 21.

The lens L is bevelled at its periphery by grinding, in the usual manner; to provide annular converging surface portions 22, 23 and form an annular apex 24.

In accordance with the instant invention, there is provided a resilient liner 25 which may be of extruded vinyl copolymer, rubber, synthetic rubber or synthetic resins having resilient and compressible properties. Such liner made in long lengths, is cut into short lengths equal to the peripheral extent of lens channel 18, for insertion therein and for supporting lens L. Alternatively, the liner may be molded in ring form, having a cross-section as described below.

As shown in Fig. 2, liner 25 is distinguished by slightly convergent, opposed side walls 26, a top wall 27 formed with a V-shaped groove 28 for receiving apex 24 and bevel portions 22, 23 of lens L; and a bottom wall 29 formed with a groove 30 which may be of semicircular shape. Groove 30 may be in substantial alignment with groove 28.

The liner 25 fills the channel 18 and the opposite corner edges 31 of said liner are snugly received between opposed walls 19, 20 of channel 18. However, the lower ends of liner side walls 26 are spaced slightly from the lower ends of channel walls 19, 20; thereby forming a pair of annular spaces 32 of substantially triangular section.

It will be apparent that upon mounting lenses L in their lens receiving portions 14, the same will seat upon liner 25; the liner groove 28 facilitating the location of lens apex 24 in the mounting operation. The resilient nature of liner 25 permits lens L to be readily mounted despite any inaccuracies in the grinding of lens bevel portions 22, 23 or any irregularities in the peripheral portions of said lens. Furthermore, the annular spaces 32 and groove 30 allow for any necessary displacement of material of the liner 25 in respect to the channel side walls 19, 20 or bottom wall 21, at any point in the peripheral extent of channel 18.

Furthermore, any irregularities in the channel 18 caused by normal wear of the tools used in forming said channel, which may result in some diminution in the spacing between the channel side walls 19, 20 or their relationship to channel bottom wall 21, will not unduly compress the liner 25 in view of its convergent side walls 26.

The liner 25 cut to proper length or in ring form, is easily inserted in channels 18 of the frame 10. The location of the lenses L in their respective openings and the final assembly operations incident to such lens mounting, will be facilitated since the liner will act to accommodate any irregularities or inaccuracies in the peripheral portions of said lenses. Also, in the assembled frame and lens the lenses L will be substantially shock and vibration proof by reason of said liner. Finally, the liner 25 will compensate and relieve any undue compressive stresses between the lenses and the frame which would be incident to irregularities in the lens periphery or somewhat improper fitting of the lenses in their respective openings.

The liner 25 may be held in channel 18 by means of a suitable adhesive applied in small amounts within the channel. However, such adhesive may be omitted, when the liner fits snugly within said channel.

As various changes might be made in the embodiment of the invention herein shown and described, without departing from the spirit thereof, it is understood that all matter herein disclosed shall be deemed illustrative and not limiting except as set forth in the appended claim.

Having thus disclosed my invention, I claim as new and desire to protect by Letters Patent:

An ophthalmic mounting comprising a continuous metal lens receiving rim, said lens receiving rim being formed with a groove having a rectangular cross section, compressible, resilient liner means within said groove, said liner means comprising top, bottom and side walls, the top wall of said liner means being disposed below the top edges of said groove, said liner top wall being formed with a lens receiving groove, the bottom wall of said liner means being in contact with the bottom wall of the metal lens receiving rim, and having a bottom groove therein aligned with said lens receiving groove, the side walls of said liner means being tapered toward the bottom wall of said metal lens receiving rim, the top outer edges of said liner means contacting opposed upper portions of the groove in said rim, said bottom groove and the space between the tapered walls of said liner means and the side walls of said groove in said rim providing a space for the expansion of said liner means when compressed by the introduction of a lens edge into said lens receiving groove.

References Cited in the file of this patent

UNITED STATES PATENTS

| | | |
|---|---|---|
| 1,177,367 | Stevens | Mar. 28, 1916 |
| 1,241,716 | Day | Oct. 2, 1917 |
| 1,704,232 | Welsh | Mar. 5, 1929 |
| 1,785,929 | Bouchard | Dec. 13, 1930 |
| 1,995,617 | Katz | Mar. 26, 1935 |
| 2,255,725 | Trescher | Sept. 9, 1941 |
| 2,387,789 | Williams | Oct. 30, 1945 |
| 2,498,065 | Budreck | Feb. 21, 1950 |
| 2,548,556 | Ogren | Apr. 10, 1951 |
| 2,579,148 | Jones | Dec. 18, 1951 |
| 2,641,031 | Ehret | June 9, 1953 |

FOREIGN PATENTS

| | | |
|---|---|---|
| 37,579 | Germany | Nov. 10, 1886 |
| 38,417 | Denmark | Jan. 28, 1928 |
| 36,713 | Netherlands | Nov. 15, 1935 |
| 562,395 | Great Britain | June 29, 1944 |